United States Patent
Hellenbrand (10) Patent No.: US 9,701,474 B2
(45) Date of Patent: Jul. 11, 2017

(54) AUTOMATED STORING AND COMMISSIONING SYSTEM FOR SMALL-PIECE GOODS

(71) Applicant: CareFusion Germany 326 GmbH, Kelberg (DE)

(72) Inventor: Christoph Hellenbrand, Kaifenheim (DE)

(73) Assignee: CareFusion Germany 326 GmbH, Kelberg (DE)

(*) Notice: Subject to any disclaimer, the term of this patent is extended or adjusted under 35 U.S.C. 154(b) by 161 days.

(21) Appl. No.: 14/434,600

(22) PCT Filed: Oct. 1, 2013

(86) PCT No.: PCT/EP2013/070446
§ 371 (c)(1),
(2) Date: Apr. 9, 2015

(87) PCT Pub. No.: WO2014/056761
PCT Pub. Date: Apr. 17, 2014

(65) Prior Publication Data
US 2015/0274422 A1    Oct. 1, 2015

(30) Foreign Application Priority Data
Oct. 9, 2012   (EP) .................................... 12187859

(51) Int. Cl.
*B65G 1/137*    (2006.01)
*B65G 47/29*    (2006.01)
(Continued)

(52) U.S. Cl.
CPC .............. *B65G 1/06* (2013.01); *B65G 1/137* (2013.01); *B65G 1/1376* (2013.01); *B65G 15/00* (2013.01);
(Continued)

(58) Field of Classification Search
CPC ... B65G 1/1376; B65G 47/29; B65G 47/8823
See application file for complete search history.

(56) References Cited

U.S. PATENT DOCUMENTS 4,385,859 A  *  5/1983  Goossens ............. B65G 1/1376
                                                          193/32
4,870,799 A  * 10/1989  Bergerioux ......... G07F 17/0092
                                                          221/123
(Continued)

FOREIGN PATENT DOCUMENTS

CN    201864268 U    6/2011
CN    102143734 A    8/2011
(Continued)

OTHER PUBLICATIONS

Office Action issued Dec. 3, 2015 in Chinese Appln. No. 201380052603.X (14 pages).
(Continued)

*Primary Examiner* — James Keenan
(74) *Attorney, Agent, or Firm* — McDermott Will & Emery LLP (57) ABSTRACT

An automated storing and picking system for packaged goods is provided. The system includes storage shelves with storage areas, at least one storage and retrieval apparatus, and at least one conveyor belt. At least one blocking device having a barrier is arranged downstream of a receiving section of the conveyor belt. A control device controls the storage and retrieval apparatus and the conveyor belt such that the packaged goods belonging to a first pack are transported to a first dispensing location and the packaged goods belonging to a subsequent pack are transported to a second dispensing location and/or are subsequently transported to the first dispensing location, such that the first pack lies downstream of the subsequent pack on the conveyor belt. The control device controls the blocking device to (Continued)

accumulate the first pack behind the barrier, release the first pack for transport, and to then accumulate the subsequent pack behind the barrier.

18 Claims, 5 Drawing Sheets

(51) Int. Cl.

| | | |
|---|---|---|
| *B65G 1/06* | (2006.01) | |
| *B65G 47/88* | (2006.01) | |
| *G07F 17/00* | (2006.01) | |
| *B65G 15/00* | (2006.01) | |
| *B65G 47/04* | (2006.01) | |
| *B65G 47/34* | (2006.01) | |
| *B65G 65/00* | (2006.01) | |
| *B65G 65/02* | (2006.01) | |

(52) U.S. Cl.
CPC ............. *B65G 47/04* (2013.01); *B65G 47/34* (2013.01); *B65G 47/8823* (2013.01); *B65G 65/005* (2013.01); *B65G 65/02* (2013.01); *G07F 17/0092* (2013.01); *B65G 2201/0235* (2013.01); *B65G 2203/0266* (2013.01); *B65G 2205/00* (2013.01); *B65G 2812/02128* (2013.01)

(56) References Cited

U.S. PATENT DOCUMENTS

| | | | | |
|---|---|---|---|---|
| 4,874,281 | A * | 10/1989 | Bergerioux | ........... B65G 1/1376 186/55 |
| 5,468,110 | A * | 11/1995 | McDonald | ........... B65G 1/1371 414/268 |
| 8,162,130 | B2 * | 4/2012 | Rabec | .................... B65G 47/29 198/418.7 |
| 8,342,313 | B2 * | 1/2013 | Wargo | .................... B65G 47/29 198/419.1 |
| 8,991,591 | B2 * | 3/2015 | Fisher | .................... B65B 35/20 198/459.6 |
| 9,085,421 | B2 * | 7/2015 | Ford | .................. B65G 47/8823 |
| 2006/0277269 | A1 | 12/2006 | Dent et al. | |

FOREIGN PATENT DOCUMENTS

| | | | |
|---|---|---|---|
| CN | 102491038 A | 6/2012 | |
| DE | 3533382 A1 * | 6/1986 | ........... B65G 1/1376 |
| EP | 0909725 A2 | 4/1999 | |
| EP | 2256703 A1 | 12/2010 | |
| WO | 2007/048155 A1 * | 5/2007 | ........... B65G 1/1376 |

OTHER PUBLICATIONS

International Search Report dated Oct. 29, 2013 for International Application No. PCT/EP2013/070446.
English translation of International Preliminary Report on Patentability for PCT/EP2013/070446 mailed Apr. 14, 2015.

* cited by examiner

AUTOMATED STORING AND COMMISSIONING SYSTEM FOR SMALL-PIECE GOODS

CROSS-REFERENCE TO RELATED APPLICATION

This application is the U.S. National Phase under 35 U.S.C. §371 of International Application No. PCT/EP2013/070446, filed on Oct. 1, 2013, which claims the benefit of EP12187859.9, filed on Oct. 9, 2012. The entire contents of these applications are incorporated by reference herein.

BACKGROUND OF THE INVENTION

The invention relates to an automated storage and picking system for small packaged goods, comprising at least one storage shelf with storage areas for the organized storage of small packaged goods, at least one storage and retrieval apparatus, movable adjacent to the storage shelf, with each such apparatus being capable of retrieving one or more small packaged goods from a storage area and transporting it to at least one dispensing point, and at least one belt conveyor, which has one at least one belt and can receive the small packaged goods transported to the at least one dispensing point on a receiving section of the belt conveyor that is assigned to the dispensing point, and can transport said goods to a dispensing device.

One automated storage and picking system of the type described in the introductory part is the "Rowa Vmax" automated picking system produced by the applicant, which is described in the company brochure "Automated Product Storage for Efficient Pharmacies", 2011/2012. This automated picking system has a rectangular, elongated housing within which storage shelves having horizontal storage areas are arranged, on the two opposing longitudinal walls of said housing, forming an aisle between the two storage shelves in which a storage and retrieval apparatus can move. The storage and retrieval apparatus has a jaw gripper such as the one described in document EP 2 165 950 A1, for example. Using said gripper, which can be moved horizontally along the aisle and vertically and can be rotated about a vertical axis in order to access the opposing shelf areas, one or more small packaged goods, specifically pharmaceutical packages (e.g. rectangular or cylindrical packages or bottles), are retrieved individually or in multiples simultaneously from the storage areas, and the retrieved small packaged goods are then transported by the storage and retrieval apparatus to a dispensing point adjoining the aisle, where they can be delivered by the storage and retrieval apparatus to a chute and/or a belt conveyor. For example, page 20 of the aforementioned company brochure shows an automated picking system of this type in which the dispensing point is located in the upper region of the end face side, wherein a conveyor belt adjoins the dispensing point and receives the pharmaceutical packages that have been retrieved from storage by the storage and retrieval apparatus and conveys them to a spiral chute, likewise illustrated, and the spiral chute conveys the packages to a counter in the dispensary of a pharmacy.

Document EP 1 902 976 A1 discloses a differently configured automated picking system in which the storage and retrieval apparatus is capable of delivering retrieved packages to multiple dispensing points on a conveyor belt that extends along a shelf.

The known automated picking system is used primarily in traditional pharmacies. In such pharmacies, customers (with or without a prescription) usually receive no more than a few pharmaceutical packages. During the period of time when the pharmacist is waiting on the customer, the storage and retrieval apparatus must therefore be able to retrieve one package or a small number of packages from storage, which are then transported via a transport belt and optionally a spiral chute to a counter in the pharmacy dispensary. The quantity or group of pharmaceutical packages to be retrieved from storage for one recipient (customer) is referred to here as a pack. Even when traditional pharmacies experience a relatively large rush, that is, multiple customers must be served within a short period of time, because the packs are small in size (small number of packages in a pack), packs intended for customers being waited on in succession rarely become mixed up, with incorrect packages being assigned to the wrong pack.

However, when an automated picking system is used in hospital pharmacies or pharmacies for nursing homes, the situation can be somewhat different. In such cases, a pack can comprise pharmaceutical packages intended for a specific ward in the hospital or nursing home, for example, and therefore one pack can comprise a multiplicity of packages. Furthermore, different packs are routinely retrieved from the storage shelves in immediate succession by the storage and retrieval apparatus (or a plurality of storage and retrieval apparatuses) and placed on a retrieval transport belt. The packs are then customarily transported to a dispensing device, where they are placed in transport bins. Depending on the location where the pharmaceutical packages are stored within the storage area, the storage and retrieval apparatus may have to traverse transport routes of varying lengths between the storage location and the dispensing point, causing some of the pharmaceutical packages to reach the belt conveyor in shorter and some in longer intervals. Thus it is also possible for packages belonging to the same pack to lie a considerable distance from one another on the transport belt, while successive packages for different packs may be spaced a relatively short distance from one another on the belt. In this case, the risk exists of a first package for a subsequent pack being inadvertently delivered to the transport bin of the preceding pack. To prevent this, for reasons of safety, the distance between the last package of a first pack and the first package of a subsequent pack is usually chosen as large enough to allow the transport bins to be safely switched. However, this results in a longer time overall for retrieving the packs from storage.

The object of the invention is therefore to improve the retrieval process under the described conditions.

This object is attained according to the invention with an automated storage and picking system for small packaged goods having the features of claim 1.

The automated storage and picking system for small packaged goods has at least one storage shelf with storage areas for the organized storage of small packaged goods, at least one storage and retrieval apparatus, movable adjacent to the storage shelf, each such apparatus being capable of retrieving one or more packaged goods from a storage area and transporting it to at least one dispensing point, and at least one belt conveyor, which has at least one belt and can receive the small packaged goods that have been transported to the at least one dispensing point on a receiving section assigned to the dispensing point, and can transport these to a dispensing device. According to the invention, at least one holding device is arranged downstream of the receiving section in the direction of transport of the belt conveyor, said holding device having a barrier which can be positioned above the belt and which prevents further transport of the packaged goods being transported thereon, even if the belt continues to move. A control device controls the storage and retrieval apparatus and the belt conveyor such that the packaged goods belonging to a first pack are transported to a first dispensing point and the packaged goods belonging to a subsequent pack are transported to a second dispensing point and/or to the first dispensing point with a delay, such that the packaged goods of the first pack lie downstream of the packaged goods of the subsequent pack on the belt conveyor. The control device controls the holding device in such a way that the barrier is positioned above the belt, blocking any further transport of the packaged goods until the packaged goods of the first pack have collected behind the barrier; the holding device is then released, allowing the first pack to be further transported, after which the barrier is again positioned above the belt so that the packaged goods of the subsequent pack will collect behind the barrier. The small packaged goods in this case are preferably pharmaceutical packages and bottles or other containers that contain pharmaceuticals. A pack in this case is a group of similar or varied small packaged goods that are to be dispensed together, particularly transported together in a single bin. The invention is based on the concept of transforming the continuous transport of various packaged goods on the belt conveyor, in which the last package of a first pack can be located immediately in front of the first packages of a subsequent pack, into a more discontinuous dispensing of groups of pharmaceuticals, resulting in a stream of packs of small packaged goods that can be channeled more efficiently into various bins for receiving the packs. The group of packages concentrated in this manner, or the pack, therefore forms a package stream which requires a shorter time to move along the belt conveyor and the subsequent delivery devices. This also enables two or more belt conveyors to be operated in parallel such that the groups of packs on the various belt conveyors can be synchronized. This further increases the speed with which the packs are delivered to the receiving bins.

In a preferred embodiment, the holding device has a barrier in the form of a pivotable plate, which is pivotable about a pivot axis arranged transversely to the direction of movement of the belt. In this connection, two embodiments are possible in principle, specifically a plate that is pivotable about a vertical pivot axis, the pivot axis being arranged adjacent to the conveyor belt, and a plate that is pivotable about a horizontal pivot axis, the pivot axis being arranged above the conveyor belt. In the embodiments having vertical pivot axes, two plates that are pivotable about parallel axes are also possible. Preferably, however, the pivotable plate is pivotable along its upper edge around a horizontal pivot axis, with the plate being pivotable upward in the direction of movement of the belt in order to release the packaged goods, and downward opposite the direction of movement of the belt to block further transport. Alternative embodiments are also possible, in which the barrier is moved vertically upward or downward.

In a development of the invention, it is provided that between each dispensing point to which the storage and retrieval apparatus transports one or more packaged goods and the designated receiving section of the belt conveyor or belt conveyors, a delivery device is provided, which conveys the packaged goods dispensed by a storage and retrieval apparatus from the dispensing point to the receiving section. This enables a simpler design for controlling the storage and retrieval apparatus, since it allows the dispensing point to be located in a place that is within the room area in which the storage and retrieval apparatus is moving in front of the shelves. The delivery device can be routed, for example, between two shelves to the back side of the shelves, so that the belt conveyor can be arranged on a side of the storage shelf that is opposite the storage and retrieval apparatus. In the simplest case, the delivery device is an inclined chute, at the upper end of which the storage and retrieval apparatus drops the small packaged goods and at the lower end of which the receiving section of the belt conveyor is located.

In a preferred development, the automated storage and picking system for small packaged goods is characterized by a plurality of belt conveyors operated in parallel, the receiving sections of which are each assigned to designated dispensing points, with each belt conveyor having at least one holding device. The parallel operation of a plurality of belt conveyors, each of which has at least one holding device, allows the packs that have collected on the respective belts upstream of the holding devices to be synchronized as they are delivered to the receiving bins. In this process, for example, a first pack is collected on a first belt conveyor behind the barrier and then released, while a subsequent pack, overlapping with the first, is being collected on the second belt conveyor behind the barrier, and is then released an interval of time after the first pack is released on the first belt. In a development having more than two belt conveyors, a third pack can be collected on a third belt conveyor with a time delay, and then released while a fourth pack is being collected on the first belt conveyor. In this embodiment, it is particularly advantageous that each belt conveyor transports the packaged goods to the same dispensing device. The collection of the packaged goods at the holding devices of the different belt conveyors is designed to overlap such that the dispensing device receives each completed pack within the shortest possible time interval, however the time intervals can be selectively adjusted such that, for example, after a first pack has been transported to a designated receiving bin but before the next pack arrives, there is a brief pause, during which the filled receiving bin can be exchanged for an empty receiving bin. A roller conveyor is located on the dispensing device, for example, on which a row of empty receiving bins is fed to the dispensing device. Each of the receiving bins is filled in succession at the dispensing device with a pack, and is then forwarded in synchronization with the release of the retaining devices on the belt conveyors.

In a preferred development of this embodiment, the dispensing device has delivery devices for further transport adjoining the ends of each belt conveyor, with each of said delivery devices conveying the packaged goods of a pack to one of several receiving bins positioned in succession at the dispensing device. The delivery devices are preferably drop tubes, chutes and/or spiral chutes.

A plurality of holding devices, spaced one in front of the other, are preferably arranged on one belt conveyor, or on each of a plurality of belt conveyors, or on all belt conveyors, so that a plurality of packs can be collected on each belt conveyor. This permits an even better synchronization of the infeed of the various collected packs to the dispensing device for dispensing to pre-positioned receiving bins.

An advantageous development of the automated storage and picking system according to the invention is characterized in that at least two storage shelves are arranged parallel with one another in a longitudinal direction such that an aisle is formed between the storage shelves, in which the at least one storage and retrieval apparatus moves, the belt conveyor or conveyors being arranged adjacent to one storage shelf or both storage shelves on a side that faces away from the aisle. Preferably, two or three storage and retrieval apparatuses are arranged in the aisle. Preferably, a plurality of belt conveyors is arranged one above the other in the longitudinal direction, adjacent to one storage shelf or both storage shelves, with each of the belt conveyors having one holding device or a plurality of holding devices.

In a particularly preferred embodiment, four storage shelves are arranged in parallel in the longitudinal direction such that, in each case, an aisle for at least one storage and retrieval apparatus, preferably for two or three storage and retrieval apparatuses, is formed between two outer storage shelves, and an aisle for accommodating a plurality of belt conveyors arranged one above the other is formed between the center storage shelves, wherein in each case, delivery devices are provided between the dispensing points for the storage and retrieval apparatuses that border the outer aisles and the designated receiving sections of the belt conveyors.

In a method according to the invention for operating an automated storage and picking system for small packaged goods, packs of the small packaged goods are collected on each of at least two belt conveyors at the holding devices thereof, and once one pack has been collected on each, the holding devices of the different belt conveyors are released at overlapping intervals, so that a relatively high filling frequency of the receiving bins at the dispensing device can be achieved. For example, a first pack is collected on a first belt conveyor behind a barrier and then released, while, overlapping with the first, a subsequent pack is being collected on the second belt conveyor behind a barrier, which is then released an interval of time after the release of the first pack on the first belt. In a development having more than two belt conveyors, a third pack can be collected on a third belt conveyor with a time delay, and then released while a fourth pack is being collected on the first belt conveyor. The collection of the packaged goods at the holding devices on the various belt conveyors is designed to overlap in such a way that the dispensing device receives each completed pack within the shortest possible time, wherein the time intervals can be selectively adjusted such that, for example, after the first pack has been transported to a designated receiving bin but before the next pack arrives, there is a brief pause during which the filled receiving bin can be exchanged for an empty receiving bin.

Advantageous and/or preferred developments of the invention are specified in the dependent claims.

BRIEF DESCRIPTION OF THE DRAWINGS

In the following, the invention will be specified in greater detail in the context of a preferred embodiment represented in the set of drawings. The drawings show.

The automated storage and picking system for small packaged goods represented in FIGS. 1 to 5 is used for storing and picking pharmaceutical packages, which can comprise both rectangular packages and cylindrical containers or bottles.

Figure 1:
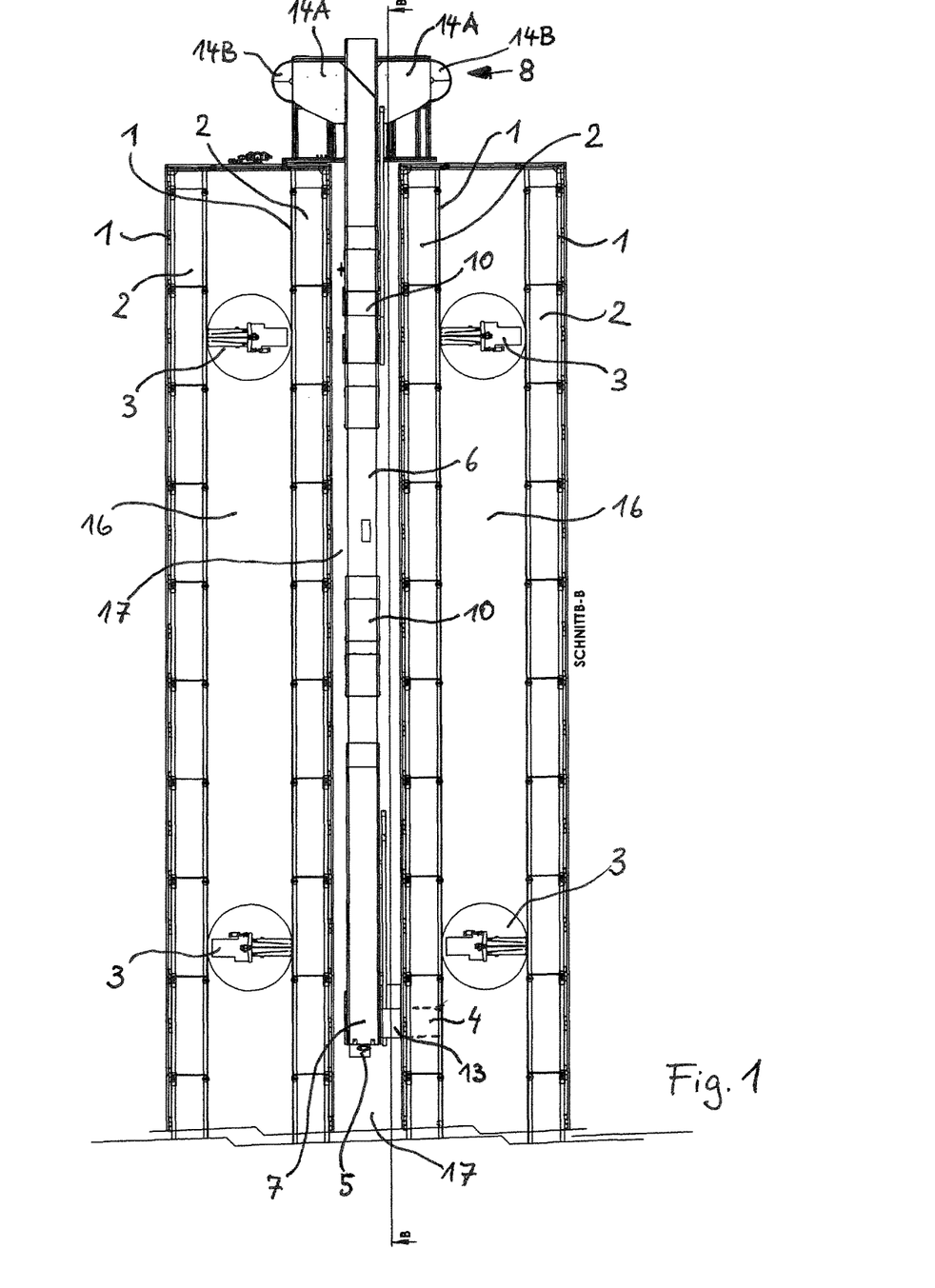
FIG. 1 a schematic plan view of a section of an automated storage and picking system for small packaged goods according to the invention, FIG. 2 a sectional view of the automated storage and picking system shown in FIG. 1, along line B-B of FIG. 1, FIG. 3 an elevation view of the automated system shown in FIGS. 1 and 2, FIG. 4 an enlarged section of the plan view according to FIG. 1, and FIG. 5 an enlarged section of the lateral sectional view according to FIG. 2, which shows two holding devices.

The plan view according to FIG. 1 shows four storage shelves 1 arranged in parallel, with FIG. 1 showing a section illustrating approximately half of the storage shelves. The storage shelves have horizontal storage areas 2 arranged one above the other, on which the pharmaceutical packages are stored side by side and one in front of the other. Between each of the outer pairs of storage shelves 1, an aisle 16 is formed. In aisle 16, a plurality of storage and retrieval apparatuses 3 move, with two storage and retrieval apparatuses 3 being shown in each aisle in the embodiment according to FIG. 1. The storage and retrieval apparatuses comprise a jaw gripper, such as the one described in document EP 2 165 950 A1, for example. The jaw gripper is mounted on a vertical track, and can be moved vertically upward and downward. At the base of the track is a fixture equipped with a drive, which can be moved longitudinally along a track that extends longitudinally along the aisle. Furthermore, the jaw gripper is capable of rotating 180° around the vertical axis. This is indicated in FIG. 1 by the circle drawn around each of jaw grippers 3. Thus jaw grippers 3 can move horizontally and vertically within the plane of shelf aisles 16 and can also rotate in such a way that each jaw gripper 3 is able to access every point on the storage shelves 1 arranged on both sides of aisles 16.

Figure 2:
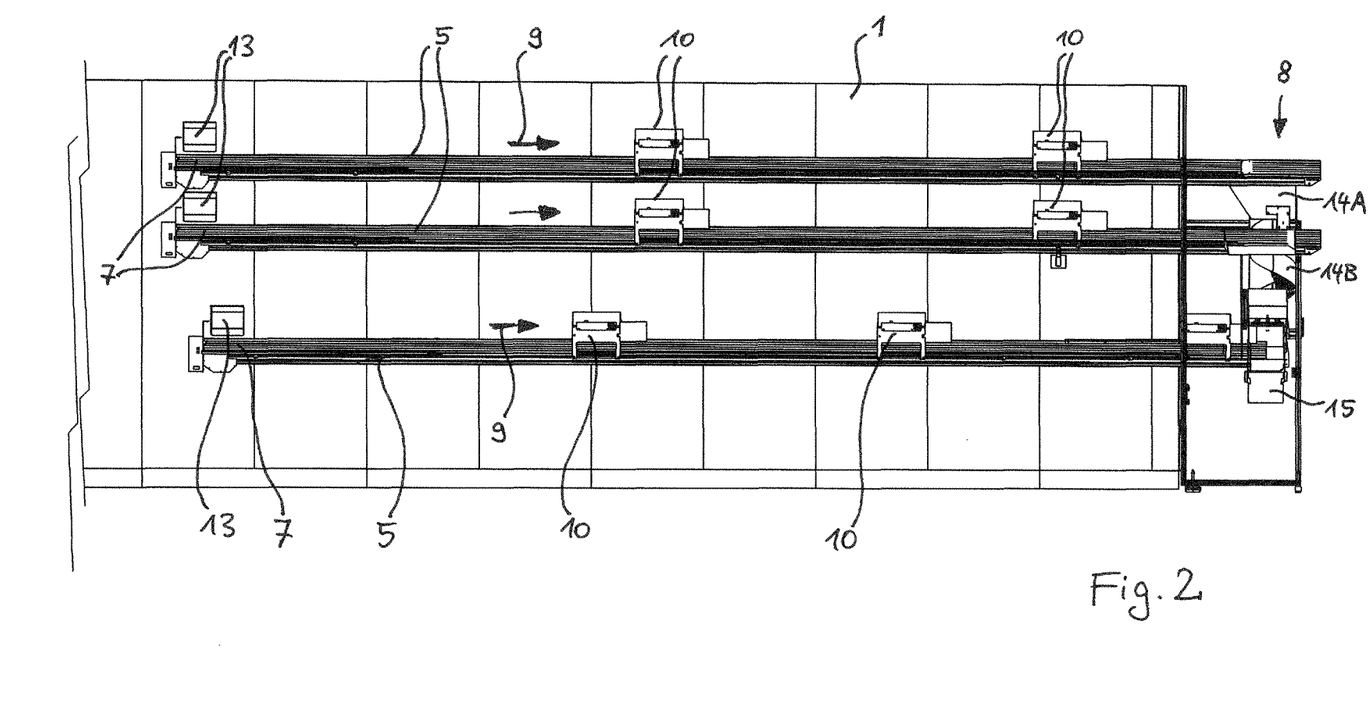

Between the two inner storage shelves 1 is an additional aisle 17, in which a plurality of belt conveyors 5 are arranged one above the other, as is clear particularly from the side view according to FIG. 2. In the embodiment represented in the figures, three belt conveyors 5 are arranged one above the other in the section of the automated storage and picking system shown. Each belt conveyor 5 has a revolving transport belt 6. The direction of transport of belt conveyors 5 is represented in FIG. 2 by arrows 9. Belt conveyors 5 have lateral boundary walls above belt 6 to prevent the transported pharmaceutical packages from dropping off at the sides.

Figure 3:
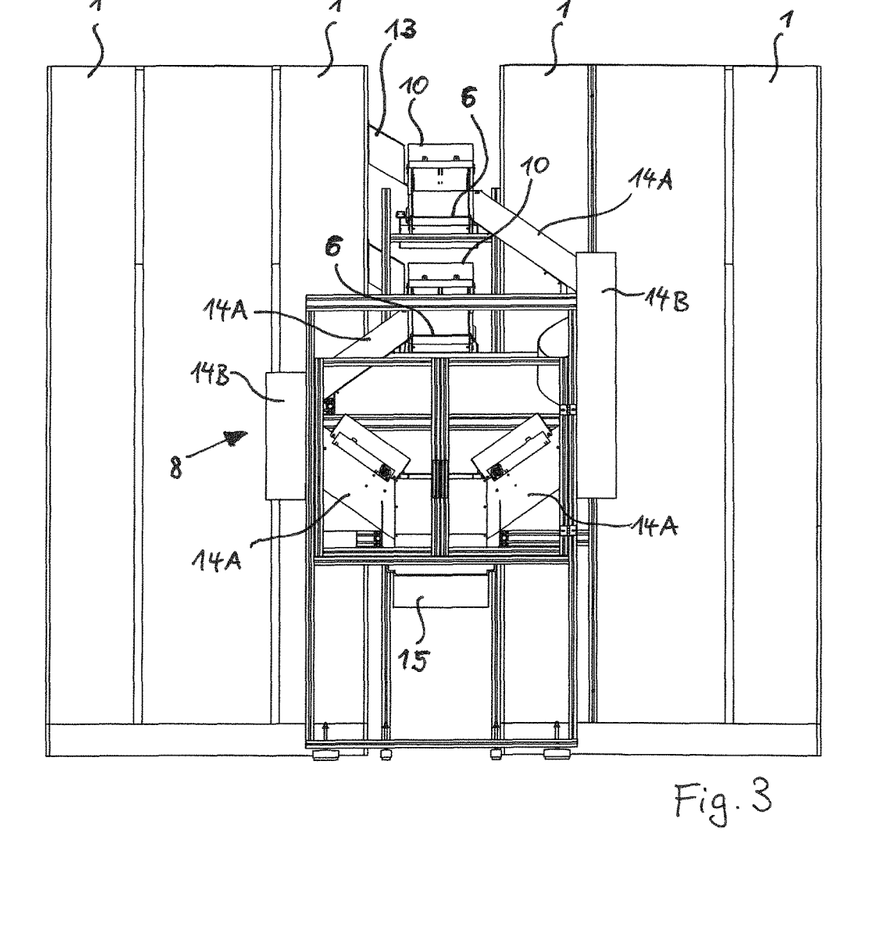
Figure 4:
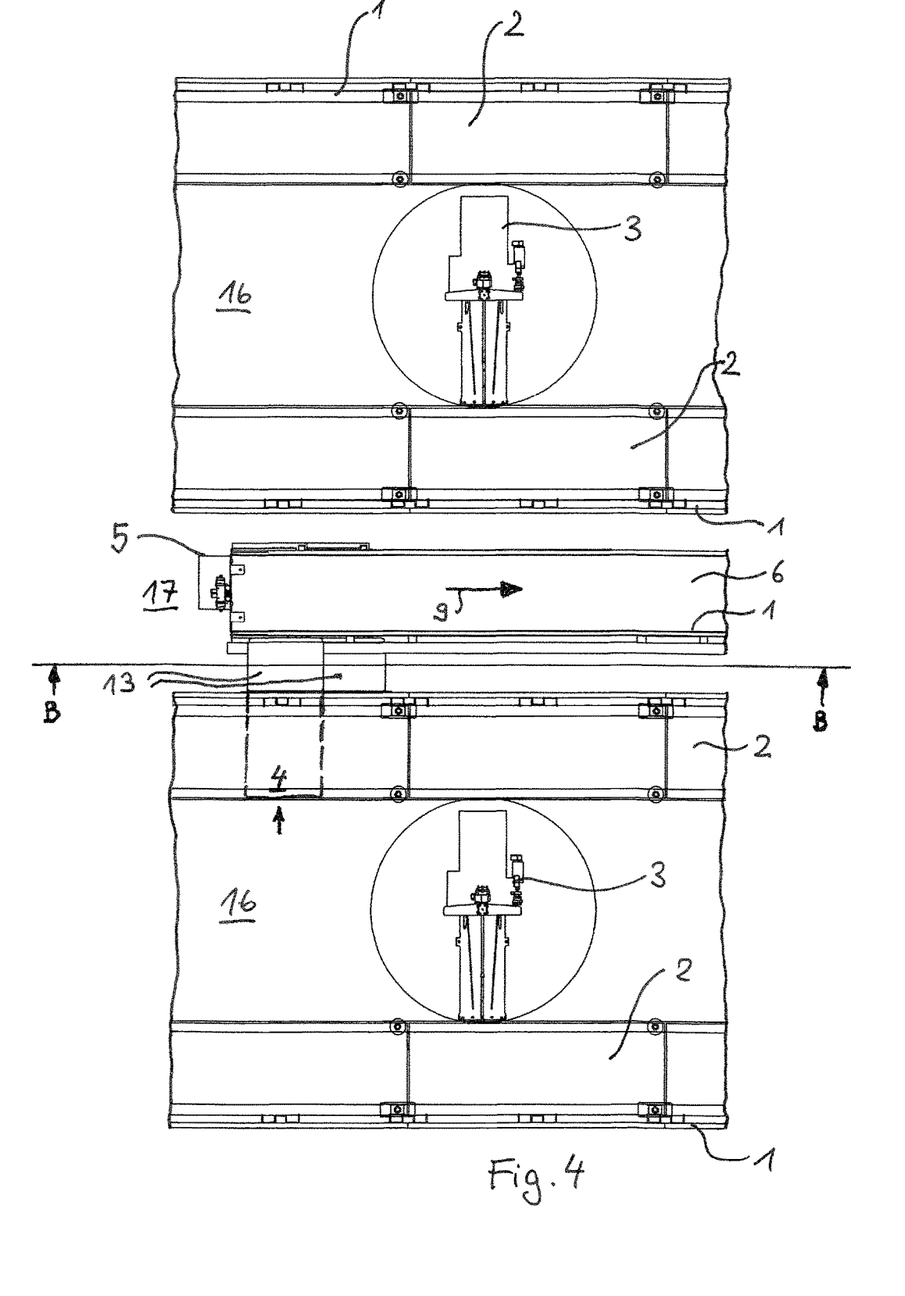
Figure 5:
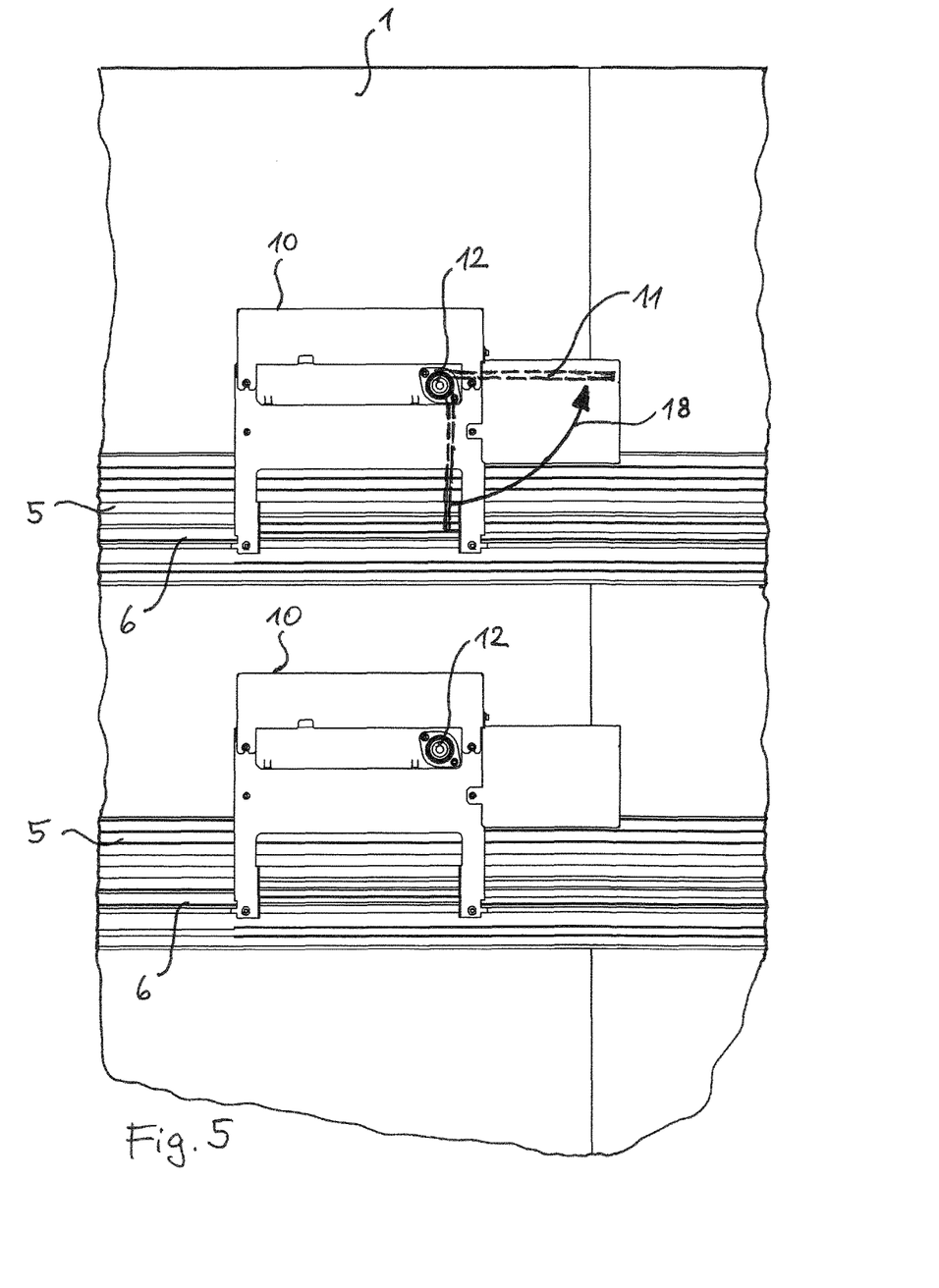

The procedure for retrieving a pack of pharmaceutical packages from storage, that is, a predetermined group of varied or similar pharmaceutical packages which are intended for a specific recipient (a customer, or a hospital ward, for example), is as follows. By means of a control device (not shown in the figures), the storage and retrieval apparatuses 3 are tasked with retrieving the pharmaceutical packages belonging to the pack from shelves 2 and transporting them to a dispensing point. In so doing, the jaw grippers of storage and retrieval apparatuses 3 each grip one package or a plurality of packages and pull these from the horizontal storage areas (shelves) 3 onto a feed table of storage and retrieval apparatus 3. Storage and retrieval apparatus 3 then moves to the dispensing point, which in FIG. 1 is denoted by reference sign 4 for one of the two aisles. At dispensing point 4, the packages resting on the table of storage and retrieval apparatus 3 are pushed forward horizontally so that they drop, for example, into a chute 13 which begins at dispensing point 4. Chute 13 represents the delivery device which transports the pharmaceutical packages dispensed by storage and retrieval apparatus 3 from dispensing point 4 to a receiving section 7 of belt conveyor 5. The retrieved pharmaceutical packages leave chute 13 and arrive at receiving section 7, which is shown in FIGS. 1 and 3. As is clear from FIG. 2, in the represented embodiment, receiving sections 7 of belt conveyor 5 are each located at the start of belt 6 (as viewed in the direction of transport 9). Depending on the route that must be traveled by storage and retrieval apparatuses 3 in order to retrieve a package from a shelf 2 and transport it to dispensing point 4, the pharmaceutical packages arrive after shorter or longer intervals in groups of 1 to 4 packages, for example, at receiving sections 7 of belt conveyors 5 via delivery devices 13. Belt conveyors 5 transport the packages in direction 9 up to a dispensing device 8. At dispensing device 8, the pharmaceutical packages leave the belt conveyors 5 and are transported via chutes 14A and spiral chutes 14B to a receiving bin 15 arranged below the lowermost belt conveyor 5. Dispensing device 8 is designed such that pharmaceutical packages that arrive simultaneously via belt conveyors 5 are forwarded to receiving bins 15 positioned below dispensing device 8. Receiving bins 15 are rectangular plastic bins, for example, which can be moved along a roller conveyor in a direction perpendicular to the drawing plane of FIG. 2, below dispensing device 8. Once a receiving bin 15 is filled, it is moved forward on the roller conveyor, so that a new, empty receiving bin can be positioned in the receiving position below dispensing device 8. The roller conveyor and the devices for bringing up and forwarding receiving bins 15 are not shown in the figures.

As is clear particularly in FIG. 2, two holding devices 10 are arranged above each of the three belt conveyors 5. Holding devices 10 have a barrier 11 that can be positioned above belt 6, as is illustrated particularly in FIG. 5, in the upper of the two holding devices 10 shown there. The barrier is formed, for example, by a plate 11 that is pivotable around an axis 12. To allow transport of the pharmaceutical packages in the direction of movement 9, plate 11 is pivoted upward along an arc in the direction of movement of belt 6, as indicated by arrow 18 in FIG. 5. To block further transport, plate 11 is pivoted back downward, so that it is positioned approximately vertically. Each holding device 10 has its own drive (not shown in the figures) for pivoting barrier 11.

The basic concept behind providing holding devices 10 on belt conveyors 5 according to the invention is that this allows the continuous stream of pharmaceutical packages that are delivered by storage and retrieval apparatuses 3 via delivery devices 13 to receiving sections 7 of belt conveyors 5, in which the pharmaceutical packages are spaced to a greater or lesser degree, to be transformed to a stream of collections (packs) of a larger number of pharmaceutical packages with predefined spacing (in terms of both time and space on the belts). This enables a row of receiving bins 15 that are transported in succession to dispensing device 8 to be filled more quickly. The individual storage and retrieval apparatuses 3 are actuated, for example, such that the pharmaceutical packages of a first pack are transported on uppermost belt conveyor 5, with a first holding device 10 being positioned in the blocking position so that the packages of the first pack, which are placed in succession on the belt by storage and retrieval apparatuses 3, will collect at said holding device. At the same time, storage and retrieval apparatuses 3 can transport packages of a second and/or third pack to receiving sections 7 of the second and third belt conveyors 5, the first holding devices 10 of which are also in the blocking position, so that the second and third packs will collect at the holding devices of the center and/or lowermost belt conveyor 5. Once a pack has been fully collected in front of a holding device 10, which can occur at different times on each of the individual belt conveyors 5, designated barrier 11 is pivoted into the release position, and barrier 11 of holding device 10 that is downstream in direction of transport 9 is moved to the blocking position, so that the entire pack is transported on belt conveyor 5 until it reaches the second holding device 10 located downstream. As soon as the last pharmaceutical package of the pack has left holding device 10 which is located upstream, barrier 11 thereof is moved back to the blocking position, whereupon storage and retrieval apparatuses 3 can place pharmaceutical packages of a fourth or another pack on said belt conveyors 5. In this manner, two packs each, or a total of six packs in the embodiment represented in FIG. 2, can be collected on belt conveyors 5. These six packs can then be transported within a relatively short period of time to six designated receiving bins 15 by releasing the associated holding devices 10 with a time delay relative to one another such that in each case a pack leaves the last holding device 10 located downstream and reaches designated receiving bin 15 via chutes 14A and 14B and the belt conveyors. Because the entire pack has been collected on a spatially short section of belt 6 of belt conveyor 5, a relatively short period of time is required to fill the entire pack into receiving bin 15. Once this has been accomplished, the next receiving bin 15 can be positioned below dispensing device 8 to receive the next pack. At the same time, the next retaining device 10 is released, etc.

The core concept of this retrieval method according to the invention is therefore the combination of collecting the packs on a relatively short section of belt conveyor 5 at the respective holding devices 10 combined with the synchronized release of the holding devices so that a relatively high filling frequency of receiving bins 15 at dispensing device 8 can be achieved.

FIG. 3 shows an end face of the four storage shelves with one embodiment of dispensing device 8. Uppermost belt conveyor 5 has an inclined (clearly visible in FIG. 1) baffle plate positioned above belt 6, which the pharmaceutical packages strike, causing them to move laterally off the belt and travel, via uppermost chute 14A (likewise visible in FIG. 1), a spiral chute 14B (in FIG. 3, in addition to the vertical paneling, a half loop of the spiral is clearly visible) and an additional chute 14A, to receiving bin 15. At center belt conveyor 5, an inclined chute 14A, a short spiral chute 14B and another inclined chute 14A are likewise provided. The lowermost transport belt ends at the end face directly above receiving bin 15.

Numerous alternative embodiments are possible within the scope of the concept of the invention. For instance, the number of shelves 1 arranged in parallel, the number of storage and retrieval apparatuses 3 that can be moved within the shelf aisles, the number of belt conveyors 5 and the number of retaining devices 10 on the belt conveyors 5 can be varied as needed. The shelves also do not have to be arranged precisely along one spatial direction; curved aisle designs or angled aisles are also possible. With alternative designs, storage forms can also be used in which the pharmaceutical packages are stored not on flat shelves but in angled storage chutes, with the storage and retrieval apparatuses having angled transport chutes. The storage and retrieval apparatuses can have both jaw grippers and suction grippers. Arrangements that have pushing devices for pushing pharmaceutical packages out of storage channels are also possible. The receiving sections 7 for receiving the retrieved pharmaceutical packages can be arranged (as in FIG. 2, for example) both at one end of belt conveyor 5 and at another location on belt conveyor 5, for example between two retaining devices 10. It would thereby be possible, for example, for two retaining devices 10 arranged spaced from one another on a belt conveyor 5 to be in the blocking position simultaneously, with the packaged goods of one pack being fed by means of a first delivery device 13 arranged at the belt end to the first holding device 10 arranged upstream in direction of transport 9, while packaged goods of a second pack are fed by means of another delivery device 13 (arranged downstream of the first holding device 10 upstream thereof) to belt conveyor 5. Also possible are configurations in which a plurality of receiving bins can be filled at the same time at dispensing device 8 by switching delivery devices 14 accordingly between the ends of the belt conveyors 5 and the positions of the plurality of receiving bins 15.

What is claimed is:

1. An automated storage and picking system for small packaged goods, comprising:
   a storage shelf with a plurality of storage areas for the organized storage of small packaged goods;
   a storage and retrieval apparatus, configured to be movable adjacent to the storage shelf, the storage and retrieval apparatus configured for retrieving one or more small packaged goods from the plurality of storage areas and transporting the one or more small packaged goods to at least one of a first and a second dispensing point; and
   a belt conveyor having a belt and configured to receive the one or more small packaged goods on at least one receiving section of the belt conveyor, each receiving section assigned to one of the first and the second dispensing point, wherein the belt conveyor is configured to transport the one or more small packaged goods to a dispensing device;
   a delivery device arranged between each dispensing point and assigned receiving section, each delivery device configured to convey one or more of the packaged goods delivered by the storage and retrieval apparatus from its corresponding dispensing point to its assigned receiving section;
   a holding device arranged downstream of at least one receiving section in the direction of transport of the belt conveyor, the holding device having a barrier configured to be positioned above the belt, the barrier configured to prevent further transport of the packaged goods being transported thereon even if the belt continues to move; and
   a control device configured to control the storage and retrieval apparatus and the belt conveyor so that packaged goods belonging to a first pack are transported to the first dispensing point and packaged goods belonging to a subsequent pack are one of transported to the second dispensing point and transported to the first dispensing point at a later time, such that the packaged goods of the first pack lie downstream of the packaged goods of the subsequent pack on the belt conveyor, wherein the control device is configured to control the holding device to:
      position the barrier above the belt, blocking the further transport of the packaged goods, until the packaged goods of the first pack have collected behind the barrier;
      release the holding device so that the first pack is further transported; and
      position the barrier back above the belt so that the packaged goods of the subsequent pack collect behind the barrier.

2. The system of claim 1, wherein the barrier comprises a pivotable plate configured to be pivotable about a pivot axis arranged transversely to a direction of movement of the belt.

3. The system of claim 2, wherein the pivotable plate is pivotable along its upper edge about a horizontal pivot axis, wherein the pivotable plate is configured to be pivoted upward in the direction of movement of the belt to release the packaged goods, and is configured to be pivoted downward opposite the direction of movement of the belt to block further transport.

4. The system of claim 1, wherein a plurality of belt conveyors are configured to operate in parallel, wherein receiving sections of each of the plurality of belt conveyors are assigned to dispensing points, wherein each belt conveyor has at least one holding device.

5. The system of claim 4, wherein each belt conveyor is configured to transport the packaged goods to the same dispensing device.

6. The system of claim 5, wherein the dispensing device has delivery devices for further transport adjoining the ends of each belt conveyor, each delivery device configured to convey the packaged goods of a pack to one of a plurality of receiving bins positioned in succession at the dispensing device.

7. The system of claim 6, wherein the delivery devices comprise at least one of drop tubes, chutes and spiral chutes.

8. The system of claim 1, wherein a plurality of holding devices are spaced one in front of the other and arranged on the belt conveyor so that a plurality of packs can be collected on the belt conveyor.

9. The system of claim 1, wherein at least two storage shelves are arranged in parallel in a longitudinal direction such that an aisle is formed between the storage shelves, wherein the storage and retrieval apparatus is configured to move within the aisle, wherein the belt conveyor is arranged adjacent to one of the storage shelves on a side facing away from the aisle.

10. The system of claim 9, wherein a plurality of belt conveyors are arranged adjacent to one of the storage shelves and one above the other in the longitudinal direction, each of the plurality of belt conveyors having one or more holding devices.

11. The system of claim 9, wherein at least two storage and retrieval apparatuses are configured to move independently of one another within the aisle.

12. The system of claim 9, wherein first through fourth storage shelves are arranged in parallel in the longitudinal direction, wherein an outer aisle for at least one storage and retrieval apparatus is formed between each of the first and second storage shelves and the third and fourth storage shelves, and an aisle for accommodating a plurality of belt conveyors arranged one above the other is formed between the second and third storage shelves, wherein, delivery devices are provided between the dispensing points for the at least one storage and retrieval apparatus that borders the outer aisles and the designated receiving sections of the belt conveyors.

13. A method for operating an automated storage and picking system for small packaged goods, the method comprising:
   providing the automated storage and picking system for small packaged goods of claim 4;
   operating the plurality of belt conveyors in parallel;
   assigning the receiving sections to designated dispensing points;
   providing at least one holding device for each of the plurality of belt conveyors;
   collecting packs of the small packaged goods on at least two belt conveyors, at the at least one holding device of each belt conveyor; and
   releasing the holding devices of the different belt conveyors in synchronization once a pack has been collected at each.

14. The method of claim 13, further comprising:
providing a plurality of holding devices, spaced one in front of another, on one of the plurality of belt conveyors; and
collecting a plurality of packs on the one of the plurality of belt conveyors having the plurality of holding devices.

15. A storage and picking system, comprising:
a storage shelf having storage areas for packaged goods;
a storage and retrieval apparatus configured to:
   move adjacent the storage shelf to retrieve a plurality of packaged goods from the storage areas of the shelf; and
   to transport the retrieved packaged goods to a dispensing point;
a belt conveyor having a belt, wherein a receiving section of the belt conveyor is assigned to the dispensing point, the belt conveyor configured to transport the retrieved packaged goods;
a delivery device arranged between the dispensing point and the assigned receiving section, the delivery device configured to deliver the retrieved packaged goods from the dispensing point to the assigned receiving section of the belt conveyor;
a holding device arranged downstream of the receiving section, the holding device comprising a movable barrier positioned above the belt;
a dispensing device configured to receive the retrieved packaged goods from the belt conveyor; and
a control device configured to control the storage and retrieval apparatus and the belt conveyor, wherein the movable barrier is configured to block the further transport of the retrieved packaged goods until a pack of packaged goods is collected behind the barrier, wherein the barrier is configured to release the pack of packaged goods, and wherein the belt conveyor is configured to further transport the pack of packaged goods to the dispensing device.

16. The system of claim 15, further comprising:
a receiving bin; and
wherein the dispensing device comprises one or more dispensing delivery devices, wherein the one or more dispensing delivery devices are configured to convey the pack of packaged goods to the receiving bin.

17. The system of claim 15, wherein a plurality of holding devices are arranged one in front of another on the belt conveyor and configured to collect a plurality of packs of packaged goods on the belt conveyor.

18. The system of claim 15, wherein a plurality of storage shelves are arranged in parallel, wherein the storage and retrieval apparatus is configured to be movable in a first aisle formed between a first and a second of the plurality of storage shelves, wherein the belt conveyor is arranged in a second aisle formed between the second and a third of the plurality of storage shelves.

* * * * *